United States Patent
Sofue et al.

(10) Patent No.: US 11,437,607 B2
(45) Date of Patent: Sep. 6, 2022

(54) DISPERSANT FOR ELECTRODE COATING LIQUID, ELECTRODE COATING LIQUID COMPOSITION INCLUDING THE DISPERSANT FOR ELECTRODE COATING LIQUID, ELECTRODE FOR POWER STORAGE DEVICE MANUFACTURED USING THE ELECTRODE COATING LIQUID COMPOSITION, AND POWER STORAGE DEVICE HAVING THE ELECTRODE

(71) Applicant: DAI-ICHI KOGYO SEIYAKU CO., LTD., Kyoto (JP)

(72) Inventors: Ayano Sofue, Kyoto (JP); Yasuteru Saito, Kyoto (JP); Yosuke Goi, Kyoto (JP); Yoshiki Ito, Kyoto (JP); Tetsuya Higashizaki, Kyoto (JP); Yuji Hoshihara, Kyoto (JP); Masaaki Matsumoto, Kyoto (JP)

(73) Assignee: DAI-ICHI KOGYO SEIYAKU CO., LTD., Kyoto (JP)

( * ) Notice: Subject to any disclaimer, the term of this patent is extended or adjusted under 35 U.S.C. 154(b) by 227 days.

(21) Appl. No.: 16/624,912

(22) PCT Filed: Jan. 24, 2018

(86) PCT No.: PCT/JP2018/002045
§ 371 (c)(1),
(2) Date: Dec. 20, 2019

(87) PCT Pub. No.: WO2019/008801
PCT Pub. Date: Jan. 10, 2019

(65) Prior Publication Data
US 2021/0210740 A1    Jul. 8, 2021

(30) Foreign Application Priority Data
Jul. 4, 2017 (JP) .............................. JP2017-131256

(51) Int. Cl.
*H01M 4/04* (2006.01)
*H01M 4/60* (2006.01)
*H01M 4/62* (2006.01)

(52) U.S. Cl.
CPC ......... *H01M 4/0416* (2013.01); *H01M 4/604* (2013.01)

(58) Field of Classification Search
None
See application file for complete search history.

(56) References Cited

U.S. PATENT DOCUMENTS

| | | | | |
|---|---|---|---|---|
| 2014/0206798 A1* | 7/2014 | Oomori | ............... | C09D 7/68 |
| | | | | 524/35 |
| 2014/0248537 A1* | 9/2014 | Hayashi | ............... | H01M 4/485 |
| | | | | 536/56 |
| 2016/0319467 A1* | 11/2016 | Yamato | ............... | C08B 15/06 |
| 2016/0333116 A1* | 11/2016 | Nakatani | ............... | C08B 11/12 |
| 2018/0108941 A1* | 4/2018 | Lee | ............... | H01M 4/626 |
| 2019/0085511 A1* | 3/2019 | Shimaoka | ............... | C08J 3/20 |
| 2019/0169314 A1* | 6/2019 | Yoshida | ............... | C08L 75/14 |

FOREIGN PATENT DOCUMENTS

| | | |
|---|---|---|
| JP | 2009170410 | 7/2009 |
| JP | 2010238575 | 10/2010 |
| JP | 2010279896 | 12/2010 |
| JP | 2011192610 | 9/2011 |
| JP | 2014024928 | 2/2014 |
| JP | 2015125920 | 7/2015 |
| JP | 2016194069 | 11/2016 |
| JP | 2017052942 | 3/2017 |
| WO | 2010018771 | 2/2010 |
| WO | 2015107995 | 7/2015 |

OTHER PUBLICATIONS

Petroudy, Physical and mechanical properties of natural fibers. Advanced High Strength Natural Fibre Composites in Construction. http://dx.doi.org/10.1016/B978-0-08-100411-1.00003-0. (Year: 2017).*
"International Search Report (Form PCT/ISA/210) of PCT/JP2018/002045," dated Apr. 17, 2018, with English translation thereof, pp. 1-4.

* cited by examiner

*Primary Examiner* — Tracy M Dove
(74) *Attorney, Agent, or Firm* — JCIPRNET

(57) ABSTRACT

A composition that includes a dispersion stabilizer for an electrode coating liquid for a power storage device is provided. The composition has superior ability to stably disperse an electrode active material and a conductive material, and makes it possible to manufacture a uniform electrode, even when a dispersion device that has weak shear force is used. A dispersant for an electrode coating liquid for a power storage device, the dispersant being characterized by containing cellulose fibers that satisfy (a)-(c). (a) The number average width of the short widths is 2-200 nm. (b) The aspect ratio is 7.5-250. (c) Cellulose I crystals are included and the crystallinity thereof is 70%-95%.

19 Claims, No Drawings

DISPERSANT FOR ELECTRODE COATING LIQUID, ELECTRODE COATING LIQUID COMPOSITION INCLUDING THE DISPERSANT FOR ELECTRODE COATING LIQUID, ELECTRODE FOR POWER STORAGE DEVICE MANUFACTURED USING THE ELECTRODE COATING LIQUID COMPOSITION, AND POWER STORAGE DEVICE HAVING THE ELECTRODE

CROSS-REFERENCE TO RELATED APPLICATION

This application is a 371 of international application of PCT application serial no. PCT/JP2018/002045, filed on Jan. 24, 2018, which claims the priority benefit of Japan application no. 2017-131256, filed on Jul. 4, 2017. The entirety of each of the above—mentioned patent applications is hereby incorporated by reference herein and made a part of this specification.

TECHNICAL FIELD

The present invention relates to a dispersant for an electrode coating liquid, an electrode coating liquid composition including the dispersant for an electrode coating liquid, a power storage device electrode manufactured using the electrode coating liquid composition, and a power storage device including the power storage device electrode.

BACKGROUND ART

In recent years, regarding power sources for driving electronic devices, power storage devices having a high voltage and a high energy density have been required. In particular, it is expected that lithium ion secondary batteries, lithium ion capacitors, and the like will be used in power storage devices having a high voltage and a high energy density. Thus, the electrode used for a power storage device is generally produced by coating a mixture containing electrode active material particles, conductive material particles, and a binding agent to a surface of a current collector and drying it. Examples of power storage devices include a lithium ion secondary battery, an electric double layer capacitor, and a lithium ion capacitor. Such a power storage device mainly includes members such as electrodes, a non-aqueous electrolyte solution, and a separator.

Among these, a power storage device electrode is formed by, for example, coating an electrode mixture solution for a power storage device in which an electrode active material and a conductive material are dispersed in an organic solvent or water together with a binding agent to a metal foil which is a surface of a current collector and drying it. Of course, characteristics of a power storage device are greatly influenced by the main constituent materials used such as an electrode particle material, an electrolyte, and a current collector, but they are also greatly influenced by a binding agent, a thickening stabilizer, and a dispersant used as additives. Binding agents for a power storage device are mainly classified into an organic solvent-based binding agent in which a polymer is dissolved in an organic solvent and an aqueous binding agent in which a polymer is dissolved or dispersed in water. In particular, recently, an electrode mixture for a water-based power storage device using an aqueous binding agent has been focused on because it makes it possible to reduce an environmental load and manufacturing costs and improve a working environment. In addition, currently, electrode materials such as an electrode active material and a conductive material are becoming nanomaterials as the capacity and energy of batteries increase.

However, there are various problems in the manufacture of electrodes for water-based power storage devices, and in particular, regarding positive electrode materials, solvent-based paints are still mainstream. There are problems that, since electrode active materials and conductive materials are highly hydrophobic, it is difficult to uniformly disperse them in an aqueous medium, and when an electrode mixture with insufficient dispersion is used, coating properties for a current collector deteriorates, the electrode becomes non-uniform, and aggregates remain on the surface of the electrode, and cause short-circuiting when used in the battery.

In order to address the above problems, it is necessary to add a dispersion stabilizer that improves dispersion stability to an aqueous electrode coating liquid. The dispersion stabilizer is added to disperse and stabilize an electrode active material and a conductive material and impart a viscosity suitable for applying an electrode coating liquid. In the related art, regarding the dispersion stabilizer, water-soluble polymers are used. Among these, a carboxymethylcellulose salt is often used because it has excellent dispersion stability. (Patent Literature 1, Patent Literature 2). However, a carboxymethylcellulose salt has problems of dispersion stability being insufficient depending on the type of an electrode nanomaterial, a long time being required for dispersion stabilization, and the occurrence of an application failure of an electrode coating liquid.

In particular, the electrode active material is dispersed by mixing an electrode active material, a thickener/stabilizer, a dispersion medium, and other components to produce an electrode coating liquid. In this case, in order to increase dispersibility of an electrode active material, it is preferable to use a mixing and dispersion machine having a high dispersion ability (Patent Literature 3, Patent Literature 4). However, when a mixing and dispersion machine is used, if an excessively strong shear force is applied to the electrode material, there is a risk of the surface of the electrode active material being damaged and collapsing, which leads to deterioration of battery characteristics. Therefore, there is a need for a technique and dispersion stabilizer through which dispersion is possible with a weak shear force.

CITATION LIST

Patent Literature

[Patent Literature 1]
Japanese Patent Application Publication No. 2011-192610
[Patent Literature 2]
Japanese Patent Application Publication No. 2010-238575
[Patent Literature 3]
Japanese Patent Application Publication No. 2010-279896
[Patent Literature 4]
WO10/018771

SUMMARY OF INVENTION

Technical Problem

An object of the present invention is to a dispersant for an electrode coating liquid having excellent dispersion stability for an electrode active material and a conductive material using which a uniform electrode coating liquid composition can be produced even if a dispersion device having a weak shear force is used, an electrode coating liquid composition including the same, a power storage device electrode manufactured using the same, and a power storage device including the power storage device electrode.

Solution to Problem

The inventors conducted extensive studies to obtain a dispersant for an electrode coating liquid which has excellent dispersion stability for an electrode active material and a conductive auxiliary with low dispersibility using which a uniform electrode can be manufactured even if a dispersion device having a weak shear force is used. In the course of the studies, they focused on cellulose fibers that satisfy predetermined requirements, and found that, when a dispersant for an electrode coating liquid including the cellulose fibers is used, the stated problems are addressed, and thereby completed the present invention. That is, the present invention provides the following [1] to [7].

[1] A dispersant for an electrode coating liquid, including:
cellulose fibers that satisfy the following (a) to (c):
(a) the number average width of the short widths is 2 nm or more and 200 nm or less;
(b) the aspect ratio is 7.5 or more and 250 or less; and
(c) cellulose I crystals are included and the crystallinity thereof is 70% or more and 95% or less.

[2] The dispersant for an electrode coating liquid according to [1], wherein the cellulose fibers further satisfy the following (d):
(d) an anionic functional group is included.

[3] The dispersant for an electrode coating liquid according to [2], wherein the cellulose fibers further satisfy the following (e):
(e) the anionic functional group is a carboxyl group, and the content of the carboxyl groups is 1.2 mmol/g or more and 2.5 mmol/g or less.

[4] An electrode coating liquid composition including the dispersant for an electrode coating liquid according to any one of [1] to [3].

[5] The electrode coating liquid composition according to [4], wherein the content of the cellulose fibers is 0.05 mass % or more and 5.00 mass % or less with respect to 100 mass % of the solid content of the coating liquid composition for a power storage device.

[6] A power storage device electrode including a dried product formed of the electrode coating liquid composition according to [4] or [5].

[7] A power storage device, including
the power storage device electrode according to [6].

Advantageous Effects of Invention

In the dispersant for an electrode coating liquid of the present invention, an electrode material is uniformly dispersed with a high dispersion stability effect, and thus an electrode coating liquid composition having no deviation and an electrode produced therefrom are obtained, and the obtained power storage device has high electron conductivity and accordingly, the internal resistance is low so that there is an effect of improving battery performance.

In addition, the dispersant for an electrode coating liquid of the present invention has an excellent dispersion effect and thus enables an electrode coating liquid composition to be uniformly dispersed using a simple mechanical dispersion device having a weak shear force without requiring a strong mechanical dispersion operation that is necessary to uniformly disperse an electrode coating liquid composition in the related art.

DESCRIPTION OF EMBODIMENTS

Next, embodiments of the present invention will be described in detail. A dispersant for an electrode coating liquid of the present invention includes predetermined cellulose fibers.

(a) Number Average Width of the Short Widths

The number average width of the short widths of the cellulose fibers is 2 nm or more and 200 nm or less. When the number average width of the short widths is less than 2 nm, there is a risk of dispersion stability deteriorating, and when the number average width of the short widths exceeds 200 nm, there is a risk of dispersion ability decreasing.

The number average width can be measured by the following method. That is, an aqueous dispersion including fine cellulose fibers having a solid content rate of 0.05 to 0.1 mass % is prepared, the dispersion components being cast on a carbon film-coated grid that has been subjected to a hydrophilization treatment to obtain a sample for observation under a transmission electron microscope (TEM). Then, depending on the size of constituent fibers, observation of an electron microscope image is performed at any magnification of 5,000, 10,000, or 50,000. In this case, in assuming axes of arbitrary vertical and horizontal image widths in the obtained image, the sample and observation conditions (magnification, etc.) are adjusted so that 20 or more fibers intersect an axis. Then, when an observation image that satisfies these conditions has been obtained, two random vertical and horizontal axes per image are drawn with respect to the image, and the widths of fibers that cross the axis are visually read. In this manner, images of at least three non-overlapping surface parts are imaged under an electronic microscope, and values of widths of fibers that cross two axes are read (thus, information about widths of at least 20×2×3=120 fibers is obtained). According to data about the number average width of fibers obtained in this manner, the number average widths of the short widths and the long widths are calculated.

(b) Aspect Ratio

The aspect ratio of the cellulose fibers is 7.5 or more and 250 or less, and more preferably 25 or more and 75 or less. When the aspect ratio is less than 7.5, there is a risk of dispersibility of an electrode material being insufficient, and when the aspect ratio exceeds 250, a strong shear force is necessary for dispersion of an electrode material and there is a risk of an electrode material being damage.

The aspect ratio of the cellulose fibers can be measured by, for example, the following method. Specifically, cellulose is cast on a carbon film-coated grid that has been subjected to a hydrophilization treatment, and the number average width of the short widths and the number average width of the long widths of cellulose fibers are then observed in a TEM image (magnification: 10,000) negatively stained with 2% uranyl acetate. That is, according to the method described above, the number average width of the short widths and the number average width of the long widths are calculated, and the aspect ratio using these values is calculated according to the following Formula (1).

Aspect ratio=number average width of the long widths (nm)/number average width of the short widths (nm)  (1)

(c) Cellulose I Crystallinity

The cellulose fibers have cellulose I crystals, and have a crystallinity of 70% or more. When the crystallinity is less than 70%, there is a risk of characteristics derived from a cellulose crystal structure not being exhibited and dispersibility of an electrode material being insufficient. More preferably, the crystallinity is 80% or more. The upper limit of the crystallinity is not particularly limited, and in consideration of a shear force required for dispersion of an electrode material, it is preferably 95% or less, and more preferably 92% or less.

In the present invention, the crystallinity of cellulose is a cellulose I crystallinity that is calculated using a Segal method from diffraction intensity values according to an X-ray diffraction method, and is defined according to the following Formula (2).

$$\text{Cellulose } I \text{ crystallinity } (\%) = [(I_{22.6} - I_{18.5})/I_{22.6}] \times 100 \quad (2)$$

In the formula, $I_{22.6}$ indicates a diffraction intensity on the lattice plane (002 plane) (diffraction angle 2θ=22.6°) in X-ray diffraction and $I_{18.5}$ indicates a diffraction intensity on an amorphous part (diffraction angle 2θ=18.5°). Here, cellulose I type refers to a crystal form of natural cellulose, and cellulose I crystallinity refers to a proportion of the amount of a crystal region within the entire cellulose.

The cellulose fibers can be produced by a known method. Although not particularly limited, specifically, for example, cellulose fibers are obtained by suspending natural cellulose fibers in water, and processing and refining them using a high pressure homogenizer, a grinder or the like.

Natural cellulose fibers are not particularly limited as long as they are cellulose fibers derived from plants, animals, or microorganisms, and examples thereof include kraft pulp or dissolving pulp derived from softwoods or hardwoods, cotton linter, lignocellulose having a low cellulose purity, wood flour, plant cellulose, and bacterial cellulose.

In addition, regarding the cellulose fibers, bacterial cellulose fibers produced by bacteria can be used. Examples of the bacteria include the genus *Acetobacter*, and more specifically, *Acetobacter aceti*, *Acetobacter* subsp., *Acetobacter xylinum*, and the like may be exemplified. When these bacteria are cultured, cellulose is produced from the bacteria. Since the obtained product contains bacteria and cellulose fibers (bacterial cellulose) produced from the bacteria and associated with the bacteria, when the product is removed from a culture medium, and bacteria are removed by washing with water or performing an alkali treatment or the like, it is possible to obtain water-containing bacterial cellulose containing no bacteria.

(d) Anionic Functional Group

Regarding the cellulose fibers, cellulose fibers having an anionic group are preferable because an I-type crystal structure can be maintained and defibration up to a predetermined fiber diameter can be efficiently performed therewith.

The anionic group is not particularly limited, and examples thereof include a carboxylic acid group, a phosphate group, a sulfonic acid group, a sulfate group, and such groups that form a salt, and any one thereof may be included or two or more thereof may be included. In addition, a linking group may be provided between a glucose unit constituting cellulose and the above anionic group.

The salts of the anionic group are not particularly limited, and examples thereof include alkali metal salts such as sodium salts, potassium salts, and lithium salts, alkaline earth metal salts such as magnesium salts, calcium salts, and barium salts, onium salts such as ammonium salts and phosphonium salts, and amine salts such as primary amines, secondary amines, and tertiary amines.

As described above, types of anionic group include an acid type such as a carboxylic acid group, a phosphate group, a sulfonic acid group, and a sulfate group, and a salt type such as a carboxylate group, a phosphate base, a sulfonate group, and a sulfate base. In a preferable embodiment, a salt type anionic group is included, and cellulose fibers including only a salt type anionic group may be used, or cellulose fibers in which a salt type anionic group and an acid type anionic group are mixed may be used.

Here, examples of cellulose fibers including an anionic functional group according to one embodiment include oxidized cellulose obtained by oxidizing hydroxyl groups of a glucose unit constituting cellulose, and it will be described in more detail, and an example of a production method will also be described.

Although oxidized cellulose is not particularly limited, oxidized cellulose in which a hydroxyl group at the 6 position of a glucose unit is selectively oxidized is preferable. It can be confirmed by, for example, a $^{13}$C-NMR spectrum that oxidized cellulose is a cellulose in which a hydroxyl group at the 6 position on a glucose unit has been selectively oxidized.

Here, the oxidized cellulose may include an aldehyde group or a ketone group together with a carboxylic acid group (COOH) and/or a carboxylate group (COOX, here, X indicates a cation that forms a salt with a carboxylic acid), but preferably substantially includes no aldehyde groups or ketone groups.

(e) Content of Carboxyl Group

The content of carboxylic acid groups of the cellulose fibers (hereinafter, referred to as a carboxyl group amount) is preferably 1.2 mmol/g or more and more preferably 1.5 mmol/g or more. In addition, 2.5 mmol/g or less is preferable, and 2.0 mmol/g or less is more preferable. When the carboxyl group amount is within the above range, dispersibility of an electrode material becomes favorable. Regarding measurement of a carboxyl group amount of the cellulose fibers, for example, 60 mL of a slurry (0.5 to 1 mass %) is prepared from a cellulose sample of which a dry mass has been accurately weighed, the pH is adjusted to about 2.5 using a 0.1 M hydrochloric acid aqueous solution, and a 0.05 M sodium hydroxide aqueous solution is then added dropwise, and the electrical conductivity is measured. Measurement continues until the pH becomes about 11. The carboxyl group amount can be determined from a sodium hydroxide amount (V) consumed in a weak acid neutralization step in which the change in electrical conductivity is slow according to the following Formula (3).

$$\text{Carboxyl group amount (mmol/g)} = V(mL) \times [0.05/\text{cellulose mass}] \quad (3)$$

Here, as will be described below, the carboxyl group amount can be adjusted by controlling an amount of a co-oxidizing agent added in a process of oxidizing cellulose fibers or a reaction time.

The oxidized cellulose fibers can be obtained using a production method including an oxidation reaction process (1) in which natural cellulose fibers are used as a raw material, an N-oxyl compound as an oxidation catalyst is put into water therewith, an co-oxidizing agent is reacted to oxidize the natural cellulose fibers, and thereby a reaction product is obtained, a purification process (2) in which impurities are removed to obtain a reaction product impregnated with water, and a dispersion process (3) in which the reaction product impregnated with water is dispersed in a solvent.

(1) Oxidation Reaction Process

Natural cellulose fibers, and an N-oxyl compound are dispersed in water (dispersion medium), and a co-oxidizing agent is then added to start a reaction. During the reaction, a 0.5 M sodium hydroxide aqueous solution is added dropwise to maintain the pH at 10 to 11, and the reaction is considered as completed when no change in pH is observed. Here, the co-oxidizing agent is not a substance that directly oxidizes cellulose hydroxyl groups but a substance that oxidizes an N-oxyl compound used as an oxidation catalyst.

The natural cellulose fibers refer to purified cellulose fibers isolated from biosynthetic types of cellulose such as plants, animals, and bacteria-producing gels. More specific examples thereof include softwood pulp, hardwood pulp, cotton pulp such as cotton linter and cotton lint, non-wood pulp such as straw pulp and bagasse pulp, bacterial cellulose fibers (BC), cellulose fibers isolated from sea squirt, and cellulose fibers isolated from seaweeds. These may be used alone or two or more thereof may be used in combination. Among these, softwood pulp, hardwood pulp, cotton pulp such as cotton linter and cotton lint, or non-wood pulp such as straw pulp and bagasse pulp is preferable. When the natural cellulose fibers are subjected to a process of increasing a surface area such as beating, this is preferable because it is possible to increase reaction efficiency and increase productivity therewith. In addition, when fibers that are isolated and purified and then stored without being dried (never dry) are used as the natural cellulose fibers, this is preferable because microfibril bundles are likely to swell, and thus it is possible to increase reaction efficiency and reduce the number average fiber diameter after a refinement treatment.

The dispersion medium for natural cellulose fibers in the reaction is water, and the concentration of natural cellulose fibers in the aqueous reaction solution is arbitrary as long as a reagent (natural cellulose fibers) can be sufficiently diffused. Generally, the concentration is about 5% or less with respect to the mass of the aqueous reaction solution, but the reaction concentration can be increased using a device having a strong mechanical stirring power.

In addition, examples of an N-oxyl compound include a compound having a nitroxy radical that is generally used as an oxidation catalyst. Regarding the N-oxyl compound, water-soluble compounds are preferable. Among these, a piperidine nitroxyoxy radical is preferable, and 2,2,6,6-tetramethylpiperidinooxy radical (TEMPO) or 4-acetamido-TEMPO is particularly preferable. Regarding the N-oxyl compound added, a catalytic amount is sufficient, and a range of preferably 0.1 to 4 mmol/L, and more preferably 0.2 to 2 mmol/L of the compound may be added to an aqueous reaction solution.

Examples of co-oxidizing agents include hypohalous acids or salts thereof, halogenous acids or salts thereof, perhalogenic acids or salts thereof, hydrogen peroxide, and perorganic acids. These may be used alone or two or more thereof may be used in combination. Among these, alkali metal hypohalites such as sodium hypochlorite and sodium hypobromite are preferable. In addition, when sodium hypochlorite is used, it is preferable to proceed with a reaction in the presence of an alkali metal bromide such as sodium bromide in consideration of a reaction rate. An amount of the alkali metal bromide added is a molar amount about 1 to 40 times that of the N-oxyl compound, and preferably a molar amount about 10 to 20 times that of the N-oxyl compound.

The pH of the aqueous reaction solution is preferably maintained in a range of about 8 to 11. The temperature of the aqueous solution is arbitrary at about 4 to 40° C., but the reaction can be performed at room temperature (25° C.), and temperature control is not particularly required. In order to obtain a desired carboxyl group amount and the like, the degree of oxidation is controlled according to the amount of the co-oxidizing agent added and the reaction time. Generally, the reaction time is about 5 to 120 minutes, and the reaction is completed within 240 minutes at the longest. In addition, when the amount of the co-oxidizing agent added and the pH of the aqueous reaction solution are controlled, the degree of hydrolysis of cellulose molecules can be controlled and the aspect ratio of cellulose fibers can be arbitrarily set.

(2) Purification Process

Next, purification is performed in order to remove unreacted co-oxidizing agents (hypochlorous acid, etc.), various by-products, and the like. In this step, generally, since reaction product fibers are not dispersed evenly to nanofiber units, a general purification method is performed, specifically, washing with water and filtration are repeated to obtain high-purity (99 mass % or more) reaction product fibers and water dispersion components.

Regarding a purification method in the purification process, as in a method using centrifugal dehydration (for example, a continuous decanter), any device can be used as long as it can achieve the above object. An aqueous dispersion including reaction product fibers obtained in this manner has a concentration of the solid content (cellulose fibers) in a squeezed state in a range of about 10 mass % to 50 mass %. In consideration of the subsequent dispersion process, if the solid content concentration is higher than 50 mass %, this is not preferable because very large amount of energy is required for dispersion.

(3) Dispersion Process (Refinement Treatment Process)

The reaction product (aqueous dispersion) impregnated with water obtained in the purification process is dispersed in a dispersion medium and is subjected to a dispersion treatment. The viscosity increases according to the treatment and dispersion components including the refined cellulose fibers can be obtained. Here, since cellulose fibers are cut in the lengthwise direction at the same time as when cellulose fibers are refined, if the degree of the refinement treatment (for example, a treatment shear force of a dispersion machine, a treatment pressure, the number of treatments, a treatment time, etc.) is controlled, it is possible to arbitrarily set the aspect ratio of cellulose fibers. Then, as necessary, the cellulose fibers may be dried. Regarding a method of drying the cellulose fiber dispersion component, for example, when the dispersion medium is water, a spray drying method, a freeze drying method, a vacuum drying method, or the like is used, and when the dispersion medium is a solution in which water and an organic solvent are mixed, a drying method using a drum dryer, a spray drying method using a spray dryer, or the like is used. Here, the cellulose fiber dispersion component may be used in a dispersion component state without drying.

When a powerful device having a beating ability such as a homomixer under high speed rotation, a high pressure homogenizer, an ultra-high pressure homogenizer, an ultrasonic dispersion processing machine, a beater, a disk type refiner, a conical type refiner, a double disk type refiner, or a grinder is used as a dispersion machine used in the dispersion process, this is preferable because more efficient and precise downsizing is possible and an economically advantageous hydrous lubricant composition can be obtained. Here, regarding the dispersion machine, for example, a screw mixer, a paddle mixer, a disper mixer, a turbine mixer, a disper, a propeller mixer, a kneader, a blender, a homogenizer, an ultrasonic homogenizer, a colloid mill, a pebble mill, a bead mill crusher, or the like may be used. In addition, two or more types of dispersion machine may be used in combination.

(4) Reduction Process

After the oxidation reaction, preferably, the cellulose fibers are additionally subjected to a reduction reaction. Specifically, fine oxidized cellulose fibers after the oxidation reaction are dispersed in purified water, the pH of the aqueous dispersion is adjusted to about 10, and a reduction reaction is caused using various reducing agents. Regarding the reducing agents that are used in the present invention, general agents can be used, and preferable examples thereof include $LiBH_4$, $NaBH_3CN$, and $NaBH_4$. Among these, $NaBH_4$ is preferable in consideration of cost and availability.

The amount of the reducing agent is preferably in a range of 0.1 to 4 mass % and particularly preferably in a range of 1 to 3 mass % based on fine oxidized cellulose fibers. The reaction is performed at room temperature or a temperature slightly higher than room temperature, and generally performed for 10 minutes to 10 hours, and preferably for 30 minutes to 2 hours. The dispersant preferably contains one or more additives having a dispersion function in addition to the cellulose fibers.

The electrode coating liquid of the power storage device of the present invention contains, the cellulose fibers as a dispersion stabilizer.

The content of the cellulose fibers is preferably 0.05 mass % or more and 5.00 mass % or less and more preferably 0.1 mass % or more and 2.0 mass % or less with respect to 100 mass % of the solid content of the coating liquid composition for a power storage device. When the content of the cellulose fibers is less than 0.05 mass %, there is a problem of dispersion stability deteriorating and when the content of the cellulose fibers exceeds 5.00 mass %, the internal resistance of the battery increases and a thixotropy of a paint increases and thus there is a problem of producing a paint being difficult.

Other thickeners and dispersion stabilizers can be added to the electrode coating liquid composition of the power storage device of the present invention as long as the effect of the present invention is not impaired. A mixing ratio between the cellulose fibers and other thickeners and dispersion stabilizers is preferably in a range of 99:1 to 50:50. In consideration of viscosity during production of a paint, storage stability of a paint after production, a thixotropy in coating, and the like, 95:5 to 80:20 is particularly preferable. In addition, in this case, the content of the cellulose fibers and other thickeners and stabilizers is preferably 0.2 mass % or more and 10.00 mass % or less with respect to 100 mass % of the solid content of the coating liquid composition for a power storage device.

Regarding the thickener and dispersion stabilizer, those known can be used, and they are not particularly limited, and specifically, one, two or more selected from among celluloses such as hydroxymethylcellulose, carboxymethyl cellulose, and alkali metal salts thereof, methylcellulose, ethylcellulose, hydroxypropylmethylcellulose, and hydroxyethyl methylcellulose; polycarboxylic acid compounds such as polyacrylic acid and sodium polyacrylates; compounds having a vinylpyrrolidone structure such as polyvinylpyrrolidone; and polyacrylamide, polyethylene oxide, polyvinyl alcohol, sodium alginate, xanthan gum, carrageenan, guar gum, agar, and starch can be used. Among these, a carboxymethylcellulose salt can be suitably used.

Examples of an electrode binding agent used in the electrode coating liquid composition of the power storage device of the present invention include polymer compounds having water solubility and/or water dispersibility. For example, polyvinylidene fluoride and polyvinylidene fluoride copolymer resins such as copolymers of polyvinylidene fluoride with hexafluoropropylene, perfluoromethyl vinyl ether, and tetrafluoroethylene, fluorine resins such as polytetrafluoroethylene and fluoro rubber, polymers such as styrene-butadiene rubber, ethylene-propylene rubber, and styrene-acrylonitrile copolymers, and aqueous dispersions such as polyurethane resins, acrylic resins, polyester resins, polyimide resins, polyamide resins, and epoxy resins can be used, and the present invention is not limited thereto. These binding agents may be used alone or in combinations of two or more types, or two or more types of resin composite types may be used.

The power storage device of the present invention is not particularly limited, and examples thereof include known power storage devices, and specific examples thereof include a lithium secondary battery and a lithium ion capacitor.

The positive electrode active material that is used for a positive electrode of the lithium secondary battery of the present invention is not particularly limited as long as it can insert and remove lithium ions. Examples thereof include metal oxides such as $CuO$, $Cu_2O$, $MnO^2$, $MoO^3$, $V_2O_5$, $CrO_3$, $MoO_3$, $Fe_2O_3$, $Ni_2O_3$, and $CoO_3$, composite oxides of lithium and a transition metal such as $Li_xCoO_2$, $Li_xNiO_2$, $Li_xMn_2O_4$, and $LiFePO_4$, metal chalcogenides such as $TiS_2$, $MoS_2$, and $NbSe_3$, and conductive polymer compounds such as polyacene, polyparaphenylene, polypyrrole, and polyaniline.

Among these, a composite oxide of at least one selected from among transition metals such as cobalt, nickel, and manganese, which is generally called a high voltage system, and lithium is preferable because a lithium ion release ability and a high voltage are easily obtained. Specific examples of a composite oxide of cobalt, nickel, and manganese, and lithium include $LiCoO_2$, $LiMnO_2$, $LiMn_2O_4$, $LiNiO_2$, $LiNi_xCo_{(1-x)}O_2$, and $LiMn_aNi_bCo_c(a+b+c=1)$.

In addition, such lithium composite oxides that are doped with a small amount of elements such as fluorine, boron, aluminum, chromium, zirconium, molybdenum, and iron, and lithium composite oxide particles of which surfaces are treated with carbon, $MgO$, $Al_2O_3$, $SiO_2$ or the like can be used. Two or more types of positive electrode active materials can be used in combination.

Regarding the negative electrode active material that is used for a negative electrode of the lithium secondary battery, known active materials can be used without particular limitation as long as it can insert/remove the metal lithium or lithium ions. For example, carbon materials such as natural graphite, artificial graphite, non-graphitizable carbon, and easily graphitizable carbon can be used. In addition, metal materials such as the metal lithium, alloys, and tin compounds, lithium transition metal nitride, crystalline metal oxide, amorphous metal oxide, silicon compounds, conductive polymers, and the like can be used, and specific examples thereof include $Li_4Ti_5O_{12}$ and $NiSi_5C_6$.

For example, in the power storage device of the present invention, regarding an electrode active material that is used for an electrode for an electric double layer capacitor, generally, a carbon allotrope is used. Specific examples of a carbon allotrope include activated carbon, polyacene, carbon whisker, and graphite, and powders or fibers thereof can be used. A preferable electrode active material is activated carbon, and specific examples thereof include activated carbon made of an phenolic resin, rayon, an acrylonitrile resin, pitch, a coconut shell, or the like.

In electrode active materials used for an electrode for the lithium ion capacitor of the present invention, regarding an electrode active material used for a positive electrode in electrodes for a lithium ion capacitor, any material that can reversibly carry lithium ions, and anions, for example, tetrafluoroborate, can be used. Specifically, a carbon allotrope is generally used, and electrode active materials used for electric double layer capacitors can be widely used.

An electrode active material used for a negative electrode in electrodes for the lithium ion capacitor is a substance that can reversibly carry lithium ions. Specifically, electrode active materials used for negative electrodes of lithium ion secondary batteries can be widely used. Preferable examples thereof include a crystalline carbon material such as graphite and non-graphitizable carbon, and a polyacenic substance (PAS) that is also described as the positive electrode active material. Regarding such a carbon material and PAS, those obtained by carbonizing a phenolic resin or the like, performing activation as necessary, and then performing pulverizing are used.

For a power storage device electrode of the present invention, as necessary, a conductive agent is used. Regarding the conductive agent, any electron conductive material that does not adversely affect battery performance can be used. Generally, carbon blacks such as acetylene black and Ketjen black are used, but natural graphite (scaly graphite, flake graphite, earthy graphite, etc.), artificial graphite, carbon whisker, carbon fibers and metal (copper, nickel, aluminum, silver, gold, etc.) powder, metal fibers, and conductive materials such as a conductive ceramic material may be used. These can be used alone or two or more thereof can be used in combination. An amount added is preferably 0.1 to 30 mass % and particularly preferably 0.2 to 20 mass % with respect to the amount of the active material.

Regarding a current collector of the electrode active material used in the power storage device of the present invention, any electron conductor that does not adversely affect the constructed battery can be used. For example, regarding a current collector for a positive electrode, in addition to aluminum, titanium, stainless steel, nickel, baked carbon, a conductive polymer, a conductive glass, and the like, in order to improve adhesiveness, conductivity, and oxidation resistance, materials in which a surface of aluminum, copper, or the like is treated with carbon, nickel, titanium, silver, or the like can be used. In addition, regarding a current collector for a negative electrode, in addition to copper, stainless steel, nickel, aluminum, titanium, baked carbon, a conductive polymer, a conductive glass, an Al—Cd alloy, and the like, in order to improve adhesiveness, conductivity, and oxidation resistance, materials in which a surface of copper or the like is treated with carbon, nickel, titanium, silver, or the like can be used. The surface of such a current collector material can be oxidized. In addition, regarding the shape, in addition to a foil form, molded articles such as a film form, a sheet form, a net form, a punched or expanded article, a lath article, a porous article, and a foamed article are used. The thickness is not particularly limited, and those having a thickness of 1 to 100 μm are generally used.

The electrode of the power storage device of the present invention can be produced by, for example, mixing an electrode active material, a conductive agent, an electrode active material current collector, and an electrode active material and a binding agent that binds a conductive agent to a current collector to prepare a slurry-like electrode material, applying it to an aluminum foil or copper foil serving as a current collector or the like, and volatilizing a dispersion medium.

The method, order, and the like of mixing the above electrode materials are not particularly limited. For example, the active material and the conductive agent that are mixed in advance can be used, and in this case, mixing can be performed using a mortar, a mill mixer, a ball mill such as a planetary ball mill or a shaker type ball mill, a mechanofusion, or the like. In addition, since the dispersion stabilizer of the present invention does not cause decrease in viscosity due to shearing during mixing, a high shear dispersion machine such as a high pressure homogenizer, a super high pressure homogenizer, a high-speed rotary mixer, and a thin film swirl dispersion machine can be used, and dispersibility of the electrode active material is further improved. In addition, in the present invention, the active material and the conductive agent can be used without mixing them in advance, and in addition to the above method, when an auto revolving mixer or a high speed homomixer is used, an aqueous nanomaterial dispersion component having favorable storage stability can be produced. In addition, in the present invention, an aqueous nanomaterial dispersion component having favorable storage stability can be produced using excellent dispersion characteristics of the cellulose. Regarding the nanomaterial, its use is not limited to the active material and the conductive agent, but it can be used for other components.

Regarding the separator that is used in the power storage device of the present invention, separators that are used for general power storage devices can be used without particular limitation, and examples thereof include porous resins made of polyethylene, polypropylene, polyolefin, polytetrafluoroethylene, or the like, ceramics, and non-woven fabrics.

The electrolyte solution used in the power storage device of the present invention may be any electrolyte solution that is used for general power storage devices, and general solutions such as an organic electrolyte solution and an ionic liquid can be used. Examples of electrolyte salts used for the power storage device of the present invention include $LiPF_6$, $LiBF_4$, $LiClO_4$, $LiAsF_6$, $LiCl$, $LiBr$, $LiCF_3SO_3$, $LiN(CF_3SO_2)_2$, $LiC(CF_3SO_2)_3$, $LiI$, $LiAlCl_4$, $NaClO_4$, $NaBF_4$, and $NaI$, and particularly, inorganic lithium salts such as $LiPF_6$, $LiBF_4$, $LiClO_4$, and $LiAsF_6$, and organic lithium salts represented by $LiN(SO_2C_xF_{2x+1})(SO_2CyF_{2y-1})$. Here, x and y represent an integer of 0 or 1 to 4, and x+y is 2 to 8. Specific examples of organic lithium salts include $LiN(SO_2F)_2$, $LiN(SO_2CF_3)(SO_2C_2F_5)$, $LiN(SO_2CF_3)(SO_2C_3F_7)$, $LiN(SO_2CF_3)(SO_2C_4F_9)$, $LiN(SO_2C_2F_5)_2$, $LiN(SO_2C_2F_5)(SO_2C_3F_7)$, and $LiN(SO_2C_2F_5)(SO_2C_4F_9)$. Among these, $LiPF_6$, $LiBF_4$, $LiN(CF_3SO_2)_2$, $LiN(SO_2F)_2$, or $LiN(SO_2C_2F_5)_2$ is preferably used an electrolyte because it has excellent electrical characteristics. The electrolyte salts may be used alone or two or more thereof may be used. Desirably, such a lithium salt with a concentration that is generally 0.1 to 2.0 mol/L, and preferably 0.3 to 1.5 mol/L is contained in the electrolyte solution.

The organic solvent in which the electrolyte salt used in the power storage device of the present invention is dissolved is not particularly limited as long as it is an organic solvent used for a non-aqueous electrolyte solution of a power storage device, and examples thereof include a carbonate compound, a lactone compound, an ether compound, a sulfolane compound, a dioxolane compound, a ketone compound, a nitrile compound, and a halogenated hydrocarbon compound. Specific examples thereof include carbonates such as dimethyl carbonate, methyl ethyl carbonate, diethyl carbonate, ethylene carbonate, propylene carbonate, ethylene glycol dimethyl carbonate, propylene glycol dimethyl carbonate, ethylene glycol diethyl carbonate, and vinylene carbonate, lactones such as γ-butyl lactone, ethers such as dimethoxyethane, tetrahydrofuran, 2-methyltetrahydrofuran, tetrahydropyran, and 1,4-dioxane, sulfolanes such as sulfolane, and 3-methylsulfolane, dioxolanes such as 1,3-dioxolane, ketones such as 4-methyl-2-pentanone, nitriles such as acetonitrile, propionitrile, valeronitrile, and benzonitrile, halogenated hydrocarbons such as 1,2-dichloroethane, and other ionic liquids of methylformate, dimethylformamide, diethylformamide, dimethyl sulfoxide, imidazolium salts, and quaternary ammonium salts. In addition, mixtures thereof may be used. Among these organic solvents, particularly, a solvent containing one or more of non-aqueous solvents selected from the group consisting of carbonates is preferable because it has excellent electrolyte solubility, dielectric constant and viscosity.

In the power storage device of the present invention, in the case of use in a polymer electrolyte or a polymer gel electrolyte, for example, polymers such as ether, ester, siloxane, acrylonitrile, vinylidene fluoride, hexafluoropropylene, acrylate, methacrylate, styrene, vinyl acetate, vinyl chloride, and oxetane as polymer compounds, polymers having a copolymer structure, and cross-linked products thereof may be used, and one, two or more types of polymers may be used. The polymer structure is not particularly limited, and a polymer having an ether structure such as polyethylene oxide is particularly preferable.

Regarding the power storage device of the present invention, a liquid battery contains an electrolyte solution, a gel-like battery contains a precursor solution in which a polymer is dissolved in an electrolyte solution, and a solid electrolyte battery contains a polymer before crosslinking in which an electrolyte salt is dissolved in a battery container.

The power storage device according to the present invention can be formed into a cylindrical shape, a coin shape, a square shape, a laminate shape, or any other shape, the basic configuration of the battery is the same regardless of the shape, and the design can be changed depending on purposes. For example, the cylindrical device is obtained by putting a wound product in which a negative electrode formed by applying a negative electrode active material to a negative electrode current collector and a positive electrode formed by applying a positive electrode active material to a positive electrode current collector are wound with a separator therebetween into a battery can, injecting a non-aqueous electrolyte solution, and performing sealing while insulating plates are placed on the top and bottom. In addition, when applied to a coin-type battery, a disk-like negative electrode, a separator, a disk-like positive electrode, and a stainless steel plate that are laminated are accommodated in a coin-type battery can, a non-aqueous electrolyte solution is injected thereto, and sealing is performed.

EXAMPLES

Next, examples will be described together with comparative examples. However, the present invention is not limited to these examples. Here, in the examples, "%" is based on mass unless otherwise specified.

[Production of Cellulose Fibers A-1 (for an Example)]

150 ml of water, 0.25 g of sodium bromide, and 0.025 g of TEMPO were added to 2 g of softwood pulp, the mixture was sufficiently stirred and dispersed, and a 13 mass % sodium hypochlorite aqueous solution (co-oxidizing agent) was then added to 1.0 g of the pulp so that an amount of sodium hypochlorite was 6.5 mmol/g, and the reaction started. Since the pH decreased as the reaction occurred, the reaction continued until there was no change in pH (reaction time: 120 minutes) while a 0.5 N sodium hydroxide aqueous solution was added dropwise thereto so that the pH was maintained at 10 to 11. Here, during the reaction, the temperature of the reaction solution was kept at 10° C. After the reaction was completed, 0.1 N hydrochloric acid was added for neutralization, and filtration and washing with water were then repeated for purification, and cellulose fibers whose fiber surfaces were oxidized were obtained. Next, pure water was added to the cellulose fibers and diluted to 1%, the mixture was treated once at a pressure of 100 MPa using a high pressure homogenizer (H11 commercially available from Sanwa Engineering Co., Ltd.), and thereby cellulose fibers A-1 were produced.

[Production of Cellulose Fibers A-2 (for an Example)]

Cellulose fibers A-2 were produced in the same manner as in the production of the cellulose fibers A-1 except that the temperature of the reaction solution during the reaction was set to 20° C., and the pH was set to 11.

[Production of Cellulose Fibers A-3 (for an Example)]

Cellulose fibers A-3 were produced in the same manner as in the production of the cellulose fibers A-1 except that the temperature of the reaction solution during the reaction was set to 40° C., the pH was set to 11, and the amount of the sodium hypochlorite aqueous solution added was 4.0 mmol/g with respect to 1.0 g of the pulp.

[Production of Cellulose Fibers A-4 (for an Example)]

Cellulose fibers A-4 were produced in the same manner as in the production of the cellulose fibers A-3 except that the amount of the sodium hypochlorite aqueous solution added was 6.0 mmol/g with respect to 1.0 g of the pulp.

[Production of cellulose fibers A-5 (for an example)]

Cellulose fibers A-5 were produced in the same manner as in the production of the cellulose fibers A-3 except that the amount of the sodium hypochlorite aqueous solution added was 9.0 mmol/g with respect to 1.0 g of the pulp.

[Production of Cellulose Fibers A-6 (for an Example)]

10 g of microcrystalline cellulose particles ("KC Flock W-50" commercially available from Nippon Paper Industries Co., Ltd.) having an average particle size of 45 μm were suspended in 200 mL of distilled water in a glass separable flask. The separable flask was placed in an ice bath, and concentrated sulfuric acid was gradually added thereto so that the final concentration was 48 mass % while maintaining the temperature in the system at 40° C. or lower with stirring. Next, the suspension was moved to a water bath at 60° C., stirring continued for 30 minutes, a crude product was then removed, and centrifugation was performed at 8,000 rpm for 10 minutes. An excess sulfuric acid was removed according to the centrifugation operation, the residue was re-suspended in distilled water, and after centrifugation, an operation of adding distilled water again was repeated, and washing and re-suspending were repeated 5 times. The residue obtained in this operation was suspended in distilled water, the pH was adjusted to 8, and the concentration of the solid content was then adjusted to 5 mass %. Then, the obtained cellulose suspension was treated once at a pressure of 140 MPa using a high pressure homogenizer, and thereby cellulose fibers A-6 used in the present invention were obtained.

[Production of Cellulose Fibers A'-1 (for a Comparative Example)]

Cellulose fine particles were produced according to the method described in the example in Japanese Patent Application Publication No. 2003-73229. Specifically, first, a raw material pulp having a degree of polymerization of 760 obtained by cutting a sheet-like purified pulp into 5 mm×5 mm chips was dissolved in a 65 mass % sulfuric acid aqueous solution so that the concentration of cellulose at −5° C. was 5 mass %, and thereby a transparent and viscous cellulose dope was obtained. The cellulose dope was put into water (5° C.) in an amount 2.5 times by mass that of the cellulose dope with stirring, celluloses were aggregated in a flock form, and thereby a flock-like solid dispersion solution was obtained. The suspension was hydrolyzed at 85° C. for 20 minutes, and a sulfuric acid aqueous solution as a dispersion medium was then removed using a glass filter through filtration under a reduced pressure. Next, sufficient washing with water was repeated until the pH of a washing solution was about 3, and washing (neutralization) with a dilute ammonia aqueous solution having a pH of about 11 was then performed, and additionally, washing with deionized water was performed, and a translucent white gel-like product having a cellulose concentration of 6.0 mass % was obtained. The gel-like product obtained in this manner was diluted with deionized water and prepared so that the cellulose concentration was 4.0 mass %, a dispersion treatment was performed using a homomixer (T. K. Robomix, commercially available from Primix Corporation) at a rotational speed of 15,000 rpm for 10 minutes, subsequently, the treatment was performed 5 times using a ultra-high pressure homogenizer at an operation pressure of 140 MPa, and thereby cellulose fibers A'-1 were produced.

[Production of Cellulose Fibers A'-2 (for a Comparative Example)]

50 g of softwood bleached kraft pulp (NBKP) was dispersed in 4950 g of water to prepare a dispersion solution having a pulp concentration of 1 mass %. This dispersion solution was treated 10 times using Serendipiter MKCA6-3 (commercially available from Masuko Sangyo Co., Ltd.), and thereby cellulose fibers A'-2 were obtained.

[Number Average Width of the Short Widths]

The number average width of the cellulose fibers was observed using a transmission electron microscope (TEM) (JEM-1400 commercially available from JEOL Ltd.). That is, the cellulose fibers were cast on a carbon film-coated grid having been subjected to a hydrophilization treatment, and then the number average width of the short widths was calculated according to the method described above from a TEM image (magnification: 10,000) negatively stained with 2% uranyl acetate.

[Aspect Ratio]

After cellulose fibers were cast on a carbon film-coated grid having undergone a hydrophilization treatment, the number average width of the short widths and the number average width of the long widths of the cellulose fibers were observed from a TEM image (magnification: 10,000) negatively stained with 2% uranyl acetate. Specifically, according to the methods described above, the number average width of the short widths and the number average width of the long widths were calculated and the aspect ratio was calculated using these values according to the following Formula (1).

$$\text{Aspect ratio} = \text{number average width of the long widths } (nm)/\text{number average width of the short widths } (nm) \quad (1)$$

[Cellulose I Crystallinity]

An X-ray diffraction intensity of cellulose fibers was measured according to an X-ray diffraction method, and calculated from the measurement result using a Segal method according to the following Formula (2).

$$\text{Cellulose } I \text{ crystallinity } (\%) = [(I_{22.6} - I_{18.5})/I_{22.6}] \times 100 \quad (2)$$

In the formula, $I_{22.6}$ indicates a diffraction intensity on the lattice plane (002 plane) (diffraction angle 2θ=22.6°) in X-ray diffraction and $I_{18.5}$ indicates a diffraction intensity on an amorphous part (diffraction angle 2θ=18.5°). In addition, the X-ray diffraction intensity of the sample was measured using "RINT2200" (commercially available from Rigaku Corporation) under the following conditions.

X-ray source: Cu/Kα-radiation
Tube voltage: 40 Kv
Tube current: 30 mA
Measurement range: diffraction angle 2θ=5 to 35°
X-ray scanning speed: 10°/min

[Measurement of Carboxyl Group Amount]

60 ml of a cellulose aqueous dispersion in which 0.25 g of cellulose was dispersed in water was prepared, the pH was adjusted to about 2.5 using a 0.1 M hydrochloric acid aqueous solution, a 0.05 M sodium hydroxide aqueous solution was then added dropwise, and the electrical conductivity was measured. The measurement continued until the pH was 11. The carboxyl group amount was determined from a sodium hydroxide amount (V) consumed in a weak acid neutralization step in which the change in electrical conductivity was slow according to the following Formula (3).

$$\text{Carboxyl group amount } (mmol/g) = V(mL) \times [0.05/\text{cellulose mass}] \quad (3)$$

Based on the results in Table 1, in all of the celluloses A-1 to A-6 for examples, the number average width of the short widths was in a range of 2 to 200 nm, and the aspect ratio was in a range of 7.5 to 250. In addition, they had a cellulose I crystallinity of 70% or more. On the other hand, the cellulose A'-1 for a comparative example had a cellulose I crystallinity of less than 70%. The cellulose A'-2 had a cellulose I crystal structure, but both the number average width of the short widths and the aspect ratio were equal to or larger than the upper limit of the above range.

TABLE 1

|  | A-1 | A-2 | A-3 | A-4 | A-5 | A-6 | A'-1 | A'-2 |
|---|---|---|---|---|---|---|---|---|
| Amount of sodium hypochlorite added [mmol/g] | 6.5 | 6.5 | 4.0 | 6.0 | 9.0 | — | — | — |
| Crystallinity (I type) [%] | 91 | 91 | 88 | 88 | 91 | 88 | 0 | 86 |
| Number average width of short widths [nm] | 4 | 4 | 20 | 4 | 4 | 18 | 20 | 230 |
| Aspect ratio | 240 | 89 | 15 | 50 | 60 | 10.5 | 2 | 310 |
| Carboxyl group amount | 2 | 2 | 1.31 | 1.66 | 2.2 | <0.1 | <0.1 | <0.1 |

[Conductive Agent Dispersion Test]
Materials used in the dispersion test are as follows.
(Dispersion Stabilizer)
A-1: Aqueous dispersion containing 2 mass % of cellulose fibers A-1
A-2: Aqueous dispersion containing 2 mass % of cellulose fibers A-2
A-3: Aqueous dispersion containing 2 mass % of cellulose fibers A-3
A-4: Aqueous dispersion containing 2 mass % of cellulose fibers A-4
A-5: Aqueous dispersion containing 2 mass % of cellulose fibers A-5
A-6: Aqueous dispersion containing 2 mass % of cellulose fibers A-6
A'-1: Aqueous dispersion containing 2 mass % of cellulose fibers A'-1
A'-2: Aqueous dispersion containing 2 mass % of cellulose fibers A'-2
B-1: Carboxymethylcellulose salt (WS-C commercially available from DKS Co., Ltd.)
B-2: Carboxymethylcellulose salt (BSH-1 commercially available from DKS Co., Ltd.)
(Conductive Agent)
C-1: Acetylene black (HS-100 commercially available from Denka Co., Ltd.)
C-2: Ketjen black (EC600JD commercially available from Lion Corporation)
C-3: Carbon black (Super-P commercially available from Imerys)
C-4: Activated carbon (surface area:1,700 m$^2$/g)
C-5: Multilayer CNT (surface area:230 m$^2$/g)

[Preparation of Conductive Agent Aqueous Dispersion]

Example 1

99 parts by mass of C-1 as a conductive agent, and 50 parts by mass (solid content, 1 part by mass) of A-1 as a dispersion stabilizer were added, water was added so that a total solid content was 6 mass %, and the components were mixed in a homo disperser (TK Robomix commercially available from Primix Corporation) under conditions of 1,800±2,000 rpm for 90 minutes to produce a conductive agent aqueous dispersion. The degree of dispersion of the conductive agent was evaluated over time in a grind gauge (commercially available from Kotec Ltd.).

Examples 2 to 34 and Comparative Examples 1 to 18

Conductive agent aqueous dispersions were produced in the same manner as in Example 1 except that the type and amount added of the conductive agent and the type and amount added of the dispersion stabilizer were changed as shown in Table 1.

[Evaluation of Conductive Agent Dispersion Test]

In the above test content, the size of coarse particles remaining in the grind gauge was evaluated. Table 2 shows results obtained by performing measurement 90 minutes after the evaluation started.

Evaluation Criteria:
x: coarse particle size was 50 μm or less
Δ: coarse particle size was 40 μm or less
o: coarse particle size was 30 μm or less
⊚: coarse particle size was 20 μm or less

TABLE 2

|  | Example 1 | Example 2 | Example 3 | Example 4 | Example 5 | Example 6 | Example 7 | Example 8 | Example 9 |
|---|---|---|---|---|---|---|---|---|---|
| Type of dispersion stabilizer | A-1 | A-2 | A-4 | A-1 | A-2 | A-4 | A-1 | A-2 | A-4 |
| Amount of dispersion stabilizer added * | 1 | 1 | 1 | 3 | 3 | 3 | 10 | 10 | 10 |
| Type of conductive agent | C-1 | C-1 | C-1 | C-1 | C-1 | C-1 | C-1 | C-1 | C-1 |
| Amount of conductive agent added * | 99 | 99 | 99 | 97 | 97 | 97 | 90 | 90 | 90 |
| Evaluation of dispersion after 90 minutes | ⊚ | ⊚ | ⊚ | ⊚ | ⊚ | ⊚ | o | ⊚ | ⊚ |

|  | Example 10 | Example 11 | Example 12 | Example 13 | Example 14 | Example 15 | Example 16 | Example 17 | Example 18 | Example 19 |
|---|---|---|---|---|---|---|---|---|---|---|
| Type of dispersion stabilizer | A-3 | A-5 | A-6 | A-1/B-1 | A-2/B-1 | A-3/B-1 | A-4/B-1 | A-5/B-1 | A-6/B-1 | A-4/B-1 |
| Amount of dispersion stabilizer added * | 10 | 10 | 10 | 2/18 | 2/18 | 2/18 | 2/18 | 2/18 | 2/18 | 4/16 |
| Type of conductive agent | C-1 | C-1 | C-1 | C-1 | C-1 | C-1 | C-1 | C-1 | C-1 | C-1 |
| Amount of conductive agent added * | 90 | 90 | 90 | 80 | 80 | 80 | 80 | 80 | 80 | 80 |
| Evaluation of dispersion after 90 minutes | ⊚ | ⊚ | ⊚ | o | o | ⊚ | ⊚ | o | ⊚ | ⊚ |

|  | Example 20 | Example 21 | Example 22 | Example 23 | Example 24 | Example 25 | Example 26 | Example 27 | Example 28 |
|---|---|---|---|---|---|---|---|---|---|
| Type of dispersion stabilizer | A-4 | A-1/B-1 | A-4/B-1 | A-4 | A-1/B-1 | A-4/B-1 | A-4 | A-1/B-1 | A-4/B-1 |
| Amount of dispersion stabilizer added * | 10 | 2/18 | 2/18 | 10 | 2/18 | 2/18 | 10 | 2/18 | 2/18 |

TABLE 2-continued

| Type of conductive agent | C-2 | C-2 | C-2 | C-3 | C-3 | C-3 | C-4 | C-4 | C-4 |
|---|---|---|---|---|---|---|---|---|---|
| Amount of conductive agent added * | 90 | 80 | 80 | 90 | 80 | 80 | 90 | 80 | 80 |
| Evaluation of dispersion after 90 minutes | ◎ | ○ | ◎ | ◎ | ◎ | ◎ | ◎ | ○ | ◎ |

|  | Example 29 | Example 30 | Example 31 | Example 32 | Example 33 | Example 34 |
|---|---|---|---|---|---|---|
| Type of dispersion stabilizer | A-4 | A-1/B-1 | A-4/B-1 | A-4 | A-1/B-1 | A-4/B-1 |
| Amount of dispersion stabilizer added * | 10 | 2/18 | 2/18 | 10 | 2/18 | 2/18 |
| Type of conductive agent | C-5 | C-5 | C-5 | C-6 | C-6 | C-6 |
| Amount of conductive agent added * | 90 | 80 | 80 | 90 | 80 | 80 |
| Evaluation of dispersion after 90 minutes | ◎ | ○ | ◎ | ◎ | ○ | ◎ |

|  | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 |
|---|---|---|---|---|---|---|---|---|---|
| Type of dispersion stabilizer | A'-1 | A'-2 | B-1 | B-2 | B-1 | A'-1/B-1 | A'-2/B-1 | B-2/B-1 | B-1 |
| Amount of dispersion stabilizer added * | 10 | 10 | 10 | 10 | 20 | 2/18 | 2/18 | 2/18 | 10 |
| Type of conductive agent | C-1 | C-1 | C-1 | C-1 | C-1 | C-1 | C-1 | C-1 | C-2 |
| Amount of conductive agent added * | 90 | 90 | 90 | 90 | 80 | 80 | 80 | 80 | 90 |
| Evaluation of dispersion after 90 minutes | Δ | Δ | X | X | X | Δ | X | X | X |

|  | Comparative Example 10 | Comparative Example 11 | Comparative Example 12 | Comparative Example 13 | Comparative Example 14 | Comparative Example 15 | Comparative Example 16 | Comparative Example 17 | Comparative Example 18 |
|---|---|---|---|---|---|---|---|---|---|
| Type of dispersion stabilizer | B-2/B-1 | B-1 | B-2/B-1 | B-1 | B-2/B-1 | B-1 | B-2/B-1 | B-1 | B-2/B-1 |
| Amount of dispersion stabilizer added * | 20 | 10 | 2/18 | 10 | 20 | 10 | 2/18 | 10 | 2/18 |
| Type of conductive agent | C-2 | C-3 | C-3 | C-4 | C-4 | C-5 | C-5 | C-6 | C-6 |
| Amount of conductive agent added * | 80 | 90 | 80 | 90 | 80 | 90 | 80 | 90 | 80 |
| Evaluation of dispersion after 90 minutes | X | X | X | X | X | X | X | X | X |

* The amount added in the table indicates mass % with respect to 100 mass % of the solid content of the conductive agent dispersion component.

[Manufacture of Electrode]
Materials used for manufacturing of electrodes are as follows.
(Dispersion Stabilizer)
A-1: Aqueous dispersion containing 2 mass % of cellulose fibers A-1
A-2: Aqueous dispersion containing 2 mass % of cellulose fibers A-2
A-3: Aqueous dispersion containing 2 mass % of cellulose fibers A-3
A-4: Aqueous dispersion containing 2 mass % of cellulose fibers A-4
A-5: Aqueous dispersion containing 2 mass % of cellulose fibers A-5
A-6: Aqueous dispersion containing 2 mass % of cellulose fibers A-6
A'-1: Aqueous dispersion containing 2 mass % of cellulose fibers A'-1
A'-2: Aqueous dispersion containing 2 mass % of cellulose fibers A'-2
B-1: Carboxymethylcellulose salt (WS-C commercially available from DKS Co., Ltd.)
B-2: Carboxymethylcellulose salt (BSH-1 commercially available from DKS Co., Ltd.)
HEC: hydroxyethyl cellulose (commercially available from Daicel Corporation, product name: HEC Daicel SP900)
Carbomer: carboxyvinyl polymer (commercially available from Nikko Chemicals Co., Ltd, product name: Carbopol Ultrez20)
(Conductive Agent)
C-1: Acetylene black (HS-100 commercially available from Denka Co., Ltd.)
C-2: Ketjen black (EC600JD commercially available from Lion Corporation)
C-3: Carbon black (Super-P commercially available from Imerys)

(Binding Agent)
SBR: Styrene-butadiene rubber aqueous dispersion
PU-A: Polyurethane aqueous dispersion (SUPERFLEX 130 commercially available from DKS Co., Ltd.)
PU-B: Polyurethane aqueous dispersion (SUPERFLEX 420 commercially available from DKS Co., Ltd.)
PU-C: Polyurethane aqueous dispersion (F-2160D-59 commercially available from DKS Co., Ltd.)
PA: Polyacrylic acid (molecular weight 15,000 commercially available from Sigma-Aldrich Co. LLC)
(Negative Electrode Active Material)
Graphite: natural graphite
SiO: (average particle size of 4.5 μm, specific surface area of 5.5 $m^2/g$)
Graphite
LTO: $Li_4Ti_5O_{12}$
(Positive Electrode Active Material)
NMC: $LiNi_{1/3}Co_{1/3}Mn_{1/3}O_2$
LMO: $LiMn_2O_4$
LFP: $LiFePO_4$
LCO: $LiCoO_2$ (Negative Electrode 1)
100 g of natural graphite as a negative electrode active material, 0.5 g of carbon black (Super-P commercially available from Imerys) as a conductive agent, 50 g of an aqueous dispersion containing 1 mass % of cellulose fibers A-1 as a dispersion stabilizer, and 4.0 g of a solution containing 50 mass % of a styrene-butadiene rubber aqueous dispersion (SBR) as a binding agent were mixed in a homo disperser to prepare a negative electrode slurry so that the solid content was 50%. This negative electrode slurry was applied to an electrolytic copper foil having a thickness of 10 μm using a coating machine, and dried at 120° C., and a roll press processing was then performed, and thereby a negative electrode 1 containing a negative electrode active material of 7 $mg/cm^2$ was obtained.

(Negative Electrodes 2 to 32)
Negative electrodes having active material amounts shown in Table 3 and Table 5 were obtained in the same manner as in the negative electrode 1 except that types and amounts added of the negative electrode active material, the conductive agent, the dispersion stabilizer, and the binding agent were changed as shown in Table 3 and Table 5.

(Positive electrode 1)
100 g of $LiNi_{1/3}Co_{1/3}Mn_{1/3}O_2$ (NMC) as a positive electrode active material, 7.8 g of acetylene black (HS-100 commercially available from Denka Co., Ltd.) as a conductive agent, 50 g of an aqueous dispersion containing 1 mass % of cellulose fibers A-1 as a dispersion stabilizer, and 5.7 g of a solution containing 35 mass % of polyacrylic acid (molecular weight of 15,000, commercially available from Sigma-Aldrich Co. LLC) as a binding agent were mixed in a planetary mixer to prepare a positive electrode slurry so that the solid content was 50%. This positive electrode slurry was applied to an electrolytic aluminum foil having a thickness of 15 μm using a coating machine, and dried at 130° C., and a roll press processing was then performed, and thereby a positive electrode having a positive electrode active material of 13.8 $mg/cm^2$ was obtained.

(Positive Electrodes 2 to 42)
Positive electrodes having active material amounts shown in Table 4 and Table 6 were obtained in the same manner as in the positive electrode 1 except that types and amounts added of the positive electrode active material, the conductive agent, the dispersion stabilizer, and the binding agent were changed as shown in Table 4 and Table 6.

(Positive Electrode 43)
100 g of $LiNi_{1/3}Co_{1/3}Mn_{1/3}O_2$ as a positive electrode active material, 7.8 g of acetylene black (HS-100 commercially available from Denka Co., Ltd.) as a conductive agent, 6 g of polyvinylidene fluoride as a binding agent, and 61.3 g of N-methyl-2-pyrrolidone as a dispersion medium were mixed in a planetary mixer to prepare a positive electrode slurry so that the solid content was 65%. This positive electrode slurry was applied to an aluminum foil having a thickness of 15 μm using a coating machine and dried at 130° C., and a roll press processing was then performed, and thereby a positive electrode having a positive electrode active material of 13.8 $mg/cm^2$ was obtained.

[Evaluation of Electrodes]
The electrodes were evaluated according to the following evaluation items and evaluation criteria. The evaluation results are shown in the following Tables 3 to 6.

(Presence of Aggregate)
In the electrodes obtained above, using SEM-EDX (JEOL JSM-6510A), a 5 mm×5 mm area was observed at three locations, and it was determined whether there were aggregates in a 5 mm square area.

Evaluation Criteria:
⊚: The number of aggregates was 0 or more and less than 3
o: The number of aggregates was 3 or more and less than 6
Δ: The number of aggregates was 6 or more and less than 10
x: The number of aggregates was 10 or more

TABLE 3

| | Example | | | | | | | | | |
|---|---|---|---|---|---|---|---|---|---|---|
| | 27 | 28 | 29 | 30 | 31 | 32 | 33 | 34 | 35 | 36 |
| Type of electrode | Negative electrode 1 | Negative electrode 2 | Negative electrode 3 | Negative electrode 4 | Negative electrode 5 | Negative electrode 6 | Negative electrode 7 | Negative electrode 8 | Negative electrode 9 | Negative electrode 10 |
| Type of conductive agent | C-3 | C-3 | C-3 | C-3 | C-3 | C-3 | C-3 | C-3 | C-3 | C-3 |
| Amount of conductive agent added | 0.5 | 0.5 | 0.5 | 0.5 | 0.5 | 0.5 | 0.5 | 0.5 | 0.5 | 0.5 |
| Type of dispersion stabilizer | A-1 | A-2 | A-3 | A-4 | A-5 | A-1/B-2 | A-4/B-2 | A-1 | A-4 | A-1/B-2 |
| Amount of dispersion stabilizer added * | 0.5 | 0.5 | 0.5 | 0.5 | 0.5 | 0.25/0.25 | 0.25/0.25 | 0.5 | 0.5 | 0.25/0.25 |
| Type of binding agent | SBR | SBR | SBR | SBR | SBR | SBR | SBR | PU-A | PU-A | PU-A |
| Amount of binding agent added * | 2 | 2 | 2 | 2 | 2 | 2 | 2 | 2 | 2 | 2 |

TABLE 3-continued

|  | | | | | | | | | | |
|---|---|---|---|---|---|---|---|---|---|---|
| Type of active material | Graphite | Graphite | Graphite | Graphite | Graphite | Graphite | Graphite | Graphite | Graphite | Graphite |
| Amount of active material added * | 100 | 100 | 100 | 100 | 100 | 100 | 100 | 100 | 100 | 100 |
| Amount of active material (mg/cm$^2$) | 7 | 7 | 7 | 7 | 7 | 7 | 7 | 7 | 7 | 7 |
| Presence of aggregate | ◯ | ◯ | ◉ | ◉ | ◉ | ◉ | ◉ | ◯ | ◉ | ◉ |

|  | Example | | | | | | | | | |
|---|---|---|---|---|---|---|---|---|---|---|
|  | 37 | 38 | 39 | 40 | 41 | 42 | 43 | 44 | 45 | 46 |
| Type of electrode | Negative electrode 11 | Negative electrode 12 | Negative electrode 13 | Negative electrode 14 | Negative electrode 15 | Negative electrode 16 | Negative electrode 17 | Negative electrode 18 | Negative electrode 19 | Negative electrode 20 |
| Type of conductive agent | C-3 | C-3 | C-3 | C-3 | C-3 | C-3 | C-3 | C-3 | C-3 | C-3 |
| Amount of conductive agent added | 0.5 | 0.5 | 0.5 | 0.5 | 0.5 | 0.5 | 0.5 | 0.5 | 0.5 | 0.5 |
| Type of dispersion stabilizer | A-4/B-2 | A-1 | A-4 | A-1/B-2 | A-4/B-2 | A-1 | A-1 | A-1 | A-4 | A-1/B-2 |
| Amount of dispersion stabilizer added * | 0.25/0.25 | 0.5 | 0.5 | 0.25/0.25 | 0.25/0.25 | 0.5 | 0.5 | 0.5 | 0.5 | 0.25/0.25 |
| Type of binding agent | PU-A | PU-B | PU-B | PU-B | PU-B | SBR | SBR | PU-A | PU-A | PU-A |
| Amount of binding agent added * | 2 | 2 | 2 | 2 | 2 | 2 | 2 | 2 | 2 | 2 |
| Type of active material | Graphite | Graphite | Graphite | Graphite | Graphite | SiO/graphite | LTO | SiO/graphite | SiO/graphite | SiO/graphite |
| Amount of active material added * | 100 | 100 | 100 | 100 | 100 | 20/80 | 100 | 20/80 | 20/80 | 20/80 |
| Amount of active material (mg/cm$^2$) | 7 | 7 | 7 | 7 | 7 | 5 | 9.7 | 5 | 9.7 | 9.7 |
| Presence of aggregate | ◉ | ◯ | ◉ | ◉ | ◉ | ◯ | ◯ | ◯ | ◉ | ◉ |

|  | Example | |
|---|---|---|
|  | 47 | 48 |
| Type of electrode | Negative electrode 21 | Negative electrode 22 |
| Type of conductive agent | C-3 | C-3 |
| Amount of conductive agent added | 0.5 | 0.5 |
| Type of dispersion stabilizer | A-4/B-2 | A-1 |
| Amount of dispersion stabilizer added * | 0.25/0.25 | 0.5 |
| Type of binding agent | PU-A | PU-B |
| Amount of binding agent added * | 2 | 2 |
| Type of active material | SiO/graphite | SiO/graphite |
| Amount of active material added * | 20/80 | 20/80 |
| Amount of active material (mg/cm$^2$) | 9.7 | 9.7 |
| Presence of aggregate | ◉ | ◯ |

* The amount added in the table indicates mass % with respect to 100 mass % of the solid content of the conductive agent dispersion component.

TABLE 4

|  | Example | | | | | | | | | |
|---|---|---|---|---|---|---|---|---|---|---|
|  | 49 | 50 | 51 | 52 | 53 | 54 | 55 | 56 | 57 | 58 |
| Type of electrode | Positive electrode 1 | Positive electrode 2 | Positive electrode 3 | Positive electrode 4 | Positive electrode 5 | Positive electrode 6 | Positive electrode 7 | Positive electrode 8 | Positive electrode 9 | Positive electrode 10 |
| Type of conductive agent | C-1 | C-1 | C-1 | C-1 | C-1 | C-1 | C-1 | C-1 | C-1 | C-1 |
| Amount of conductive agent added | 7.8 | 7.8 | 7.8 | 7.8 | 7.8 | 7.8 | 7.8 | 7.8 | 7.8 | 7.8 |
| Type of dispersion stabilizer | A-1 | A-2 | A-3 | A-4 | A-5 | A-1/B-2 | A-4/B-2 | A-1 | A-4 | A-1/B-2 |

TABLE 4-continued

| | | | | | | | | | | |
|---|---|---|---|---|---|---|---|---|---|---|
| Amount of dispersion stabilizer added * | 0.5 | 0.5 | 0.5 | 0.5 | 0.5 | 0.25/0.25 | 0.25/0.25 | 0.5 | 0.5 | 0.25/0.25 |
| Type of binding agent | PA | PA | PA | PA | PA | PA | PA | PU-A | PU-A | PU-A |
| Amount of binding agent added * | 2 | 2 | 2 | 2 | 2 | 2 | 2 | 2 | 2 | 2 |
| Type of active material | NMC | NMC | NMC | NMC | NMC | NMC | NMC | NMC | NMC | NMC |
| Amount of active material added * | 100 | 100 | 100 | 100 | 100 | 100 | 100 | 100 | 100 | 100 |
| Amount of active material (mg/cm²) | 13.8 | 13.8 | 13.8 | 13.8 | 13.8 | 13.8 | 13.8 | 13.8 | 13.8 | 13.8 |
| Presence of aggregate | ○ | ○ | ○ | ◎ | ◎ | ○ | ◎ | ○ | ○ | ○ |

| | Example | | | | | | | | | |
|---|---|---|---|---|---|---|---|---|---|---|
| | 59 | 60 | 61 | 62 | 63 | 64 | 65 | 66 | 67 | 68 |
| Type of electrode | Positive electrode 11 | Positive electrode 12 | Positive electrode 13 | Positive electrode 14 | Positive electrode 15 | Positive electrode 16 | Positive electrode 17 | Positive electrode 18 | Positive electrode 19 | Positive electrode 20 |
| Type of conductive agent | C-1 | C-1 | C-1 | C-1 | C-1 | C-1 | C-1 | C-1 | C-1 | C-1 |
| Amount of conductive agent added | 7.8 | 7.8 | 7.8 | 7.8 | 7.8 | 7.8 | 7.8 | 7.8 | 7.8 | 8.1 |
| Type of dispersion stabilizer | A-4/B-2 | A-1 | A-1 | A-1 | A-4 | A-1/B-2 | A-4/B-2 | A-1 | A-4 | A-1/B-1 |
| Amount of dispersion stabilizer added * | 0.25/0.25 | 0.5 | 0.5 | 0.5 | 0.5 | 0.25/0.25 | 0.25/0.25 | 0.5 | 0.5 | 0.6/0.6 |
| Type of binding agent | PU-A | PU-B | PA | PU-A | PU-A | PU-A | PU-A | PU-C | PU-C | PU-C |
| Amount of binding agent added * | 2 | 2 | 2 | 2 | 2 | 2 | 2 | 2 | 2 | 3.5 |
| Type of active material | NMC | NMC | LMO | LMO | LMO | LMO | LMO | LFP | LFP | LFP |
| Amount of active material added * | 100 | 100 | 100 | 100 | 100 | 100 | 100 | 100 | 100 | 100 |
| Amount of active material (mg/cm²) | 13.8 | 13.8 | 22 | 22 | 22 | 22 | 22 | 14.5 | 14.5 | 14.5 |
| Presence of aggregate | ◎ | ○ | ○ | ○ | ◎ | ○ | ◎ | ○ | ◎ | ○ |

| | Example | | | | | | | | | |
|---|---|---|---|---|---|---|---|---|---|---|
| | 69 | 70 | 71 | 72 | 73 | 74 | 75 | 76 | 77 | 78 |
| Type of electrode | Positive electrode 21 | Positive electrode 22 | Positive electrode 23 | Positive electrode 24 | Positive electrode 25 | Positive electrode 26 | Positive electrode 27 | Positive electrode 28 | Positive electrode 29 | Positive electrode 30 |
| Type of conductive agent | C-1 | C-1 | C-1 | C-1 | C-1 | C-1 | C-1 | C-1 | C-1 | C-1 |
| Amount of conductive agent added | 8.1 | 4.5 | 4.5 | 7.8 | 4.5 | 5 | 5 | 5 | 5 | 5 |
| Type of dispersion stabilizer | A-4/B-1 | A-1/B-1 | A-4/B-1 | A-6 | A-6/B-1 | A-1 | A-1 | A-4 | A-1/B-2 | A-4/B-2 |
| Amount of dispersion stabilizer added * | 0.6/0.6 | 0.55/0.55 | 0.55/0.55 | 0.5 | 0.55/0.55 | 0.5 | 0.5 | 0.5 | 0.5 | 0.5 |
| Type of binding agent | PU-C | PU-C | PU-C | PU-C | PU-C | PA | PU-A | PU-A | PU-A | PU-A |
| Amount of binding agent added * | 3.5 | 3.3 | 3.3 | 2 | 3.3 | 2 | 2 | 2 | 2 | 2 |
| Type of active material | LFP | LFP | LFP | LFP | LFP | LCO | LCO | LCO | LCO | LCO |
| Amount of active material added * | 100 | 100 | 100 | 100 | 100 | 100 | 100 | 100 | 100 | 100 |
| Amount of active material (mg/cm²) | 14.5 | 14.5 | 14.5 | 14.5 | 14.5 | 13 | 13 | 13 | 13 | 13 |
| Presence of aggregate | ◎ | ○ | ◎ | ◎ | ◎ | ○ | ○ | ◎ | ○ | ◎ |

* The amount added in the table indicates mass % with respect to 100 mass % of the solid content of the conductive agent dispersion component.

TABLE 5

|  | Comparative Example | | | | |
| --- | --- | --- | --- | --- | --- |
|  | 19 | 20 | 21 | 22 | 23 |
| Type of electrode | Negative electrode 23 | Negative electrode 24 | Negative electrode 25 | Negative electrode 26 | Negative electrode 27 |
| Type of conductive agent | C-3 | C-3 | C-3 | C-3 | C-3 |
| Amount of conductive agent added | 0.5 | 0.5 | 0.5 | 0.5 | 0.5 |
| Type of dispersion stabilizer | A'-1 | A'-2 | HEC | Carbomer | B-1 |
| Amount of dispersion stabilizer added * | 0.5 | 0.5 | 1 | 1 | 1 |
| Type of binding agent | SBR | SBR | SBR | SBR | SBR |
| Amount of binding agent added * | 2 | 2 | 2 | 2 | 2 |
| Type of active material | Graphite | Graphite | Graphite | Graphite | Graphite |
| Amount of active material added * | 100 | 100 | 100 | 100 | 100 |
| Amount of active material (mg/cm$^2$) | 7 | 7 | 7 | 7 | 7 |
| Presence of aggregate | Δ | Δ | X | X | Δ |

|  | Comparative Example | | | | |
| --- | --- | --- | --- | --- | --- |
|  | 24 | 25 | 26 | 27 | 28 |
| Type of electrode | Negative electrode 28 | Negative electrode 29 | Negative electrode 30 | Negative electrode 31 | Negative electrode 32 |
| Type of conductive agent | C-3 | C-3 | C-3 | C-3 | C-3 |
| Amount of conductive agent added | 0.5 | 0.5 | 0.5 | 0.5 | 0.5 |
| Type of dispersion stabilizer | B-2 | HEC | Carbomer | HEC | Carbomer |
| Amount of dispersion stabilizer added * | 1 | 1 | 1 | 1 | 1 |
| Type of binding agent | SBR | SBR | SBR | SBR | SBR |
| Amount of binding agent added * | 2 | 2 | 2 | 2 | 2 |
| Type of active material | Graphite | SiO/graphite | SiO/graphite | LTO | LTO |
| Amount of active material added * | 100 | 100 | 100 | 100 | 100 |
| Amount of active material (mg/cm$^2$) | 7 | 5 | 5 | 9.7 | 9.7 |
| Presence of aggregate | Δ | X | X | X | X |

* The amount added in the table indicates mass % with respect to 100 mass % of the solid content of the conductive agent dispersion component.

TABLE 6

|  | Comparative Example | | | | | |
| --- | --- | --- | --- | --- | --- | --- |
|  | 29 | 31 | 32 | 33 | 34 | 35 |
| Type of electrode | Positive electrode 31 | Positive electrode 32 | Positive electrode 33 | Positive electrode 34 | Positive electrode 35 | Positive electrode 36 |
| Type of conductive agent | C-1 | C-1 | C-1 | C-1 | C-1 | C-1 |
| Amount of conductive agent added | 7.8 | 7.8 | 7.8 | 7.8 | 7.8 | 7.8 |
| Type of dispersion stabilizer | A'-1 | A'-2 | HEC | Carbomer | HEC | Carbomer |
| Amount of dispersion stabilizer added * | 0.5 | 0.5 | 1 | 1 | 1 | 1 |
| Type of binding agent | PU-A | PU-A | PU-A | PU-A | PU-A | PU-A |

TABLE 6-continued

|  |  |  |  |  |  |  |
|---|---|---|---|---|---|---|
| Amount of binding agent added * | 2 | 2 | 2 | 2 | 2 | 2 |
| Type of active material | NMC | NMC | NMC | NMC | LMO | LMO |
| Amount of active material added * | 100 | 100 | 100 | 100 | 100 | 100 |
| Amount of active material (mg/cm$^2$) | 13.8 | 13.8 | 13.8 | 13.8 | 22 | 22 |
| Presence of aggregate | Δ | Δ | X | X | X | X |

|  | Comparative Example |  |  |  |  |  | Reference |
|---|---|---|---|---|---|---|---|
|  | 36 | 37 | 38 | 39 | 40 | 41 | Example |
| Type of electrode | Positive electrode 37 | Positive electrode 38 | Positive electrode 39 | Positive electrode 40 | Positive electrode 41 | Positive electrode 42 | Positive electrode 43 |
| Type of conductive agent | C-1 | C-1 | C-1 | C-1 | C-1 | C-1 | C-1 |
| Amount of conductive agent added | 5 | 5 | 7.8 | 7.8 | 7.8 | 7.8 | 7.8 |
| Type of dispersion stabilizer | HEC | Carbomer | HEC | Carbomer | B-1 | B-2 | — |
| Amount of dispersion stabilizer added * | 1 | 1 | 1 | 1 | 1 | 1 | — |
| Type of binding agent | PU-A | PU-A | PU-A | PU-A | PU-A | PU-A | Polyvinylidene fluoride |
| Amount of binding agent added * | 2 | 2 | 2 | 2 | 2 | 2 | 6 |
| Type of active material | LCO | LCO | LFP | LFP | LFP | LFP | NMC |
| Amount of active material added * | 100 | 100 | 100 | 100 | 100 | 100 | 100 |
| Amount of active material (mg/cm$^2$) | 13 | 13 | 14.5 | 14.5 | 14.5 | 14.5 | 13.8 |
| Presence of aggregate | X | X | X | X | Δ | Δ | — |

* The amount added in the table indicates mass % with respect to 100 mass % of the solid content of the conductive agent dispersion component.

[Manufacture of Lithium Secondary Battery]

The positive electrode and negative electrode obtained above were combined as shown in the following Table 7 and laminated with a polyolefin (PE/PP/PE) separator as a separator interposed between the electrodes, and a positive electrode terminal and a negative electrode terminal were ultrasonic-welded to the positive and negative electrodes. This laminate was added to an aluminum laminate packaging material, and thermally sealed except for a liquid injection opening. A battery before liquid injection having a positive electrode area of 18 cm$^2$ and a negative electrode area of 19.8 cm$^2$ was manufactured. Next, an electrolyte solution in which LiPF$_6$ (1.0 mol/L) was dissolved in a solvent in which ethylene carbonate and diethyl carbonate (30/70 vol ratio) were mixed was injected, the opening was thermally sealed, and thereby an evaluation battery was obtained.

TABLE 7

|  | Electrode configuration | |
|---|---|---|
|  | Negative electrode | Positive electrode |
| Example 79 | Negative electrode 1 | Positive electrode 43 |
| Example 80 | Negative electrode 2 | Positive electrode 43 |
| Example 81 | Negative electrode 4 | Positive electrode 43 |
| Example 82 | Negative electrode 6 | Positive electrode 43 |
| Example 83 | Negative electrode 7 | Positive electrode 43 |
| Example 84 | Negative electrode 8 | Positive electrode 43 |
| Example 85 | Negative electrode 9 | Positive electrode 43 |
| Example 86 | Negative electrode 10 | Positive electrode 43 |
| Example 87 | Negative electrode 11 | Positive electrode 43 |
| Example 88 | Negative electrode 12 | Positive electrode 43 |
| Example 89 | Negative electrode 13 | Positive electrode 43 |
| Example 90 | Negative electrode 14 | Positive electrode 43 |
| Example 91 | Negative electrode 15 | Positive electrode 43 |
| Example 92 | Negative electrode 16 | Positive electrode 43 |
| Example 93 | Negative electrode 17 | Positive electrode 43 |
| Example 94 | Negative electrode 18 | Positive electrode 43 |
| Example 95 | Negative electrode 19 | Positive electrode 43 |
| Example 96 | Negative electrode 20 | Positive electrode 43 |
| Example 97 | Negative electrode 21 | Positive electrode 43 |
| Example 98 | Negative electrode 22 | Positive electrode 43 |
| Example 99 | Negative electrode 8 | Positive electrode 18 |
| Example 100 | Negative electrode 8 | Positive electrode 19 |
| Example 101 | Negative electrode 8 | Positive electrode 20 |
| Example 102 | Negative electrode 8 | Positive electrode 21 |
| Example 103 | Negative electrode 8 | Positive electrode 22 |
| Example 104 | Negative electrode 8 | Positive electrode 23 |
| Example 105 | Negative electrode 8 | Positive electrode 24 |
| Example 106 | Negative electrode 8 | Positive electrode 25 |
| Example 107 | Negative electrode 8 | Positive electrode 4 |
| Example 108 | Negative electrode 8 | Positive electrode 9 |
| Example 109 | Negative electrode 8 | Positive electrode 15 |
| Example 110 | Negative electrode 8 | Positive electrode 28 |
| Example 111 | Negative electrode 9 | Positive electrode 18 |
| Example 112 | Negative electrode 9 | Positive electrode 19 |
| Example 113 | Negative electrode 9 | Positive electrode 20 |
| Example 114 | Negative electrode 9 | Positive electrode 21 |
| Example 115 | Negative electrode 9 | Positive electrode 22 |
| Example 116 | Negative electrode 9 | Positive electrode 23 |
| Example 117 | Negative electrode 9 | Positive electrode 24 |
| Example 118 | Negative electrode 9 | Positive electrode 25 |
| Example 119 | Negative electrode 9 | Positive electrode 4 |
| Example 120 | Negative electrode 9 | Positive electrode 9 |

TABLE 7-continued

| | Electrode configuration | |
|---|---|---|
| | Negative electrode | Positive electrode |
| Example 121 | Negative electrode 9 | Positive electrode 15 |
| Example 122 | Negative electrode 9 | Positive electrode 28 |
| Example 123 | Negative electrode 11 | Positive electrode 18 |
| Example 124 | Negative electrode 11 | Positive electrode 19 |
| Example 125 | Negative electrode 11 | Positive electrode 20 |
| Example 126 | Negative electrode 11 | Positive electrode 21 |
| Example 127 | Negative electrode 11 | Positive electrode 22 |
| Example 128 | Negative electrode 11 | Positive electrode 23 |
| Example 129 | Negative electrode 11 | Positive electrode 24 |
| Example 130 | Negative electrode 11 | Positive electrode 25 |
| Example 131 | Negative electrode 11 | Positive electrode 4 |
| Example 132 | Negative electrode 11 | Positive electrode 9 |
| Example 133 | Negative electrode 11 | Positive electrode 15 |
| Example 134 | Negative electrode 11 | Positive electrode 28 |
| Comparative Example 42 | Negative electrode 23 | Positive electrode 43 |
| Comparative Example 43 | Negative electrode 24 | Positive electrode 43 |
| Comparative Example 44 | Negative electrode 27 | Positive electrode 43 |
| Comparative Example 45 | Negative electrode 29 | Positive electrode 43 |
| Comparative Example 46 | Negative electrode 32 | Positive electrode 43 |
| Comparative Example 47 | Negative electrode 24 | Positive electrode 32 |
| Comparative Example 48 | Negative electrode 24 | Positive electrode 35 |
| Comparative Example 49 | Negative electrode 24 | Positive electrode 37 |
| Comparative Example 50 | Negative electrode 24 | Positive electrode 40 |
| Comparative Example 51 | Negative electrode 24 | Positive electrode 41 |
| Comparative Example 52 | Negative electrode 11 | Positive electrode 32 |
| Comparative Example 53 | Negative electrode 11 | Positive electrode 35 |
| Comparative Example 54 | Negative electrode 11 | Positive electrode 37 |
| Comparative Example 55 | Negative electrode 11 | Positive electrode 40 |
| Comparative Example 56 | Negative electrode 11 | Positive electrode 41 |

[Evaluation of Battery Performance]

The manufactured lithium secondary batteries were subjected to the performance test at 20° C. The test method was as follows. The test results are shown in Table 8.

(Cell Impedance)

Regarding the cell impedance, a resistance value at a frequency of 1 kHz was measured using an impedance analyzer (SP-150 commercially available from Biologic).

(Charging and Discharging Cycle Characteristics)

Charging and discharging cycle characteristics were measured under the following conditions. When $LiNi_{1/3}Co_{1/3}Mn_{1/3}O_2$, $LiMn_2O_4$, or $LiCoO_2$ was used as a positive electrode active material, and natural graphite was used as a negative electrode active material, a cycle in which CC (constant current) charging was performed up to 4.2 V at a current density equivalent to 1C, and subsequently charging was switched to CV (constant voltage) charging at 4.2 V, and charging was performed for 1.5 hours, and CC discharging was then performed up to 2.7 V at a current density equivalent to 1C was performed at 20° C. 300 times. The 1C discharging capacity ratio after 300 cycles with respect to the initial 1C discharging capacity in this case was defined as a 1C charging and discharging cycle retention rate.

When $LiFePO_4$ was used as a positive electrode active material and natural graphite was used as a negative electrode active material, a cycle in which CC (constant current) charging was performed up to 4.0 V at a current density equivalent to 1C and subsequently charging was switched to CV (constant voltage) charging at 4.0 V, and charging was performed for 1.5 hours, and CC discharging was then performed up to 2.0 V at a current density equivalent to 1C was performed at 20° C. 300 times, and the 1C discharging capacity ratio after 300 cycles with respect to the initial 1C discharging capacity in this case was defined as a 1C charging and discharging cycle retention rate.

When $LiNi_{1/3}Co_{1/3}Mn_{1/3}O_2$ was used as a positive electrode active material and $Li_4Ti_5O_{12}$ was used as a negative electrode active material, a cycle in which CC (constant current) charging was performed up to 2.9 V at a current density equivalent to 1C, and subsequently charging was switched to CV (constant voltage) charging at 2.9 V, and charging was performed for 1.5 hours, and CC discharging was then performed up to 1.0 V at a current density equivalent to 1C was performed at 20° C. 300 times, and the 1C discharging capacity ratio after 300 cycles with respect to the initial 1C discharging capacity in this case was defined as a 1C charging and discharging cycle retention rate.

When $LiNi_{1/3}Co_{1/3}Mn_{1/3}O_2$ was used as a positive electrode active material and SiO/graphite was used as a negative electrode active material, a cycle in which CC (constant current) charging was performed up to 4.2 V at a current density equivalent to 1C, and subsequently charging was switched to CV (constant voltage) charging at 4.2 V, and charging was performed for 1.5 hours, and CC discharging was then performed up to 2.7 V at a current density equivalent to 1C was performed at 20° C. 50 times, and the 1C discharging capacity ratio after 50 cycles with respect to the initial 1C discharging capacity in this case was defined as a 1C charging and discharging cycle retention rate.

TABLE 8

| | Battery evaluation | |
|---|---|---|
| | Cell impedance (mΩ/1 kHz) | Capacity retention ratio (%) after charging and discharging cycle |
| Example 79 | 186 | 95 |
| Example 80 | 184 | 94 |
| Example 81 | 175 | 97 |
| Example 82 | 192 | 93 |
| Example 83 | 190 | 94 |
| Example 84 | 191 | 95 |
| Example 85 | 186 | 96 |
| Example 86 | 182 | 95 |
| Example 87 | 179 | 97 |
| Example 88 | 186 | 96 |
| Example 89 | 182 | 95 |
| Example 90 | 184 | 94 |
| Example 91 | 181 | 96 |
| Example 92 | 185 | 92 |
| Example 93 | 184 | 97 |
| Example 94 | 198 | 94 |
| Example 95 | 182 | 95 |
| Example 96 | 192 | 95 |
| Example 97 | 188 | 95 |
| Example 98 | 195 | 94 |
| Example 99 | 190 | 95 |
| Example 100 | 187 | 96 |
| Example 101 | 187 | 94 |
| Example 102 | 184 | 96 |
| Example 103 | 218 | 96 |
| Example 104 | 214 | 98 |
| Example 105 | 213 | 94 |
| Example 106 | 211 | 96 |
| Example 107 | 192 | 94 |
| Example 108 | 219 | 93 |

TABLE 8-continued

| | Battery evaluation | |
|---|---|---|
| | Cell impedance (mΩ/1 kHz) | Capacity retention ratio (%) after charging and discharging cycle |
| Example 109 | 184 | 97 |
| Example 110 | 187 | 95 |
| Example 111 | 188 | 95 |
| Example 112 | 189 | 96 |
| Example 113 | 186 | 95 |
| Example 114 | 183 | 95 |
| Example 115 | 216 | 97 |
| Example 116 | 211 | 98 |
| Example 117 | 212 | 95 |
| Example 118 | 211 | 94 |
| Example 119 | 190 | 95 |
| Example 120 | 215 | 96 |
| Example 121 | 182 | 98 |
| Example 122 | 186 | 95 |
| Example 123 | 188 | 96 |
| Example 124 | 187 | 96 |
| Example 125 | 188 | 95 |
| Example 126 | 185 | 96 |
| Example 127 | 217 | 94 |
| Example 128 | 215 | 97 |
| Example 129 | 212 | 95 |
| Example 130 | 214 | 95 |
| Example 131 | 191 | 96 |
| Example 132 | 216 | 94 |
| Example 133 | 187 | 97 |
| Example 134 | 184 | 97 |
| Example 135 | 185 | 96 |
| Example 136 | 189 | 96 |
| Comparative Example 42 | 218 | 73 |
| Comparative Example 43 | 272 | 77 |
| Comparative Example 44 | 225 | 85 |
| Comparative Example 45 | 321 | 62 |
| Comparative Example 46 | 261 | 82 |
| Comparative Example 47 | 293 | 72 |
| Comparative Example 48 | 315 | 69 |
| Comparative Example 49 | 309 | 71 |
| Comparative Example 50 | 284 | 75 |
| Comparative Example 51 | 279 | 82 |
| Comparative Example 52 | 285 | 74 |
| Comparative Example 53 | 308 | 71 |
| Comparative Example 54 | 298 | 76 |
| Comparative Example 55 | 276 | 80 |
| Comparative Example 56 | 268 | 84 |

INDUSTRIAL APPLICABILITY

THE DISPERSION STABILIZER OF THE PRESENT INVENTION CAN BE USED AS A DISPERSION STABILIZER FOR AN ELECTRODE COATING LIQUID OF THE POWER STORAGE DEVICE, AND THE ELECTRODE PRODUCED THEREFROM IS USED TO PRODUCE VARIOUS POWER STORAGE DEVICES. THE OBTAINED POWER STORAGE DEVICE CAN BE USED IN VARIOUS PORTABLE DEVICES SUCH AS A MOBILE PHONE, A LAPTOP, A PERSONAL DIGITAL ASSISTANT (PDA), A VIDEO CAMERA, AND A DIGITAL CAMERA, AND ALSO MEDIUM-SIZE OR LARGE-SIZE POWER STORAGE DEVICES MOUNTED ON ELECTRIC BICYCLES, ELECTRIC VEHICLES, AND THE LIKE.

What is claimed is:

1. An electrode coating liquid composition, comprising a conductive material and a dispersant for an electrode coating liquid, wherein the dispersant for the electrode coating liquid comprises:
    cellulose fibers that satisfy the following (a) to (c):
        (a) a number average width of a short widths is 2 nm or more and 20 nm or less;
        (b) an aspect ratio is 7.5 or more and 250 or less; and
        (c) cellulose I crystals are included and a crystallinity of the cellulose I crystals is 70% or more and 95% or less.

2. The electrode coating liquid composition according to claim 1,
    wherein the cellulose fibers further satisfy the following (d):
        (d) an anionic functional group is included.

3. The electrode coating liquid composition according to claim 2,
    wherein the cellulose fibers further satisfy the following (e):
        (e) the anionic functional group is a carboxyl group, and a content of a carboxyl groups is 1.2 mmol/g or more and 2.5 mmol/g or less.

4. The electrode coating liquid composition according to claim 1,
    wherein a content of the cellulose fibers is 0.05 mass % or more and 5.00 mass % or less with respect to 100 mass % of a solid content of the electrode coating liquid composition.

5. A power storage device electrode, comprising
    a dried product of the electrode coating liquid composition according to claim 1.

6. A power storage device, comprising
    the power storage device electrode according to claim 5.

7. The electrode coating liquid composition according to claim 1,
    wherein in the (a), the number average width of the short widths is 4 nm or more and 20 nm or less.

8. The electrode coating liquid composition according to claim 1,
    wherein in the (b), the aspect ratio is 10.5 or more and 240 or less.

9. The electrode coating liquid composition according to claim 1,
    wherein in the (b), the aspect ratio is 15 or more and 60 or less.

10. The electrode coating liquid composition according to claim 1,
    wherein in the (c), the crystallinity of the cellulose I crystals is 80% or more and 92% or less.

11. The electrode coating liquid composition according to claim 1,
    wherein in the (c), the crystallinity of the cellulose I crystals is 88% or more and 91% or less.

12. The electrode coating liquid composition according to claim 3,
    wherein the content of the carboxyl groups is 1.31 mmol/g or more and 2.2 mmol/g or less.

13. The electrode coating liquid composition according to claim 3,
    wherein the content of the carboxyl groups is 1.66 mmol/g or more and 2.0 mmol/g or less.

14. The electrode coating liquid composition according to claim 3,
wherein in the (a), the number average width of the short widths is 4 nm or more and 20 nm or less, in the (b), the aspect ratio is 15 or more and 60 or less, in the (c), the crystallinity of the cellulose I crystals is 88% or more and 91% or less, and in the (e), the content of the carboxyl groups is 1.66 mmol/g or more and 2.0 mmol/g or less.

15. The electrode coating liquid composition according to claim 1, further comprising:
a carboxymethylcellulose salt.

16. The electrode coating liquid composition according to claim 15,
wherein a mixing ratio between the cellulose fibers and the carboxymethylcellulose salt is 99:1 to 50:50.

17. The electrode coating liquid composition according to claim 15,
wherein a mixing ratio between the cellulose fibers and the carboxymethylcellulose salt is 95:5 to 80:20.

18. The electrode coating liquid composition according to claim 1,
wherein a content of the cellulose fibers is 0.1 mass % or more and 2.00 mass % or less with respect to 100 mass % of a solid content of the electrode coating liquid composition.

19. The electrode coating liquid composition according to claim 1,
wherein a content of the cellulose fibers is 0.22 mass % or more and 0.48 mass % or less with respect to 100 mass % of a solid content of the electrode coating liquid composition.

* * * * *